United States Patent
Pan et al.

(10) Patent No.: US 7,881,247 B2
(45) Date of Patent: Feb. 1, 2011

(54) METHOD AND APPARATUS FOR PROVIDING EFFICIENT PRECODING FEEDBACK IN A MIMO WIRELESS COMMUNICATION SYSTEM

(75) Inventors: Kyle Jung-Lin Pan, Smithtown, NY (US); Robert Lind Olesen, Huntington, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 708 days.

(21) Appl. No.: 11/840,328

(22) Filed: Aug. 17, 2007

(65) Prior Publication Data

US 2008/0049709 A1  Feb. 28, 2008

Related U.S. Application Data

(60) Provisional application No. 60/838,273, filed on Aug. 17, 2006, provisional application No. 60/839,195, filed on Aug. 21, 2006, provisional application No. 60/892,719, filed on Mar. 2, 2007.

(51) Int. Cl.
  H04B 7/204  (2006.01)
  H04B 7/208  (2006.01)
  H04W 4/00   (2009.01)
  H04L 1/02   (2006.01)

(52) U.S. Cl. .................. 370/319; 370/332; 370/344; 375/267

(58) Field of Classification Search ......... 370/310–350; 375/130–149, 260–267, 346–349
See application file for complete search history.

(56) References Cited

U.S. PATENT DOCUMENTS

| 6,754,473 | B1 | 6/2004 | Choi et al. | |
|---|---|---|---|---|
| 7,146,557 | B2 | 12/2006 | Kim et al. | |
| 2007/0064830 | A1* | 3/2007 | Choi et al. | 375/267 |
| 2007/0211815 | A1* | 9/2007 | Pan et al. | 375/267 |
| 2007/0217540 | A1* | 9/2007 | Onggosanusi et al. | 375/267 |
| 2008/0132281 | A1* | 6/2008 | Kim et al. | 455/562.1 |
| 2008/0260053 | A1* | 10/2008 | Yun et al. | 375/260 |
| 2009/0219838 | A1* | 9/2009 | Jia et al. | 370/278 |

FOREIGN PATENT DOCUMENTS

| KR | 2006-0039804 | 9/2006 |
|---|---|---|
| RU | 2250563 | 4/2005 |

(Continued)

OTHER PUBLICATIONS

3GPP, *3rd Generation Partnership Project; Technical Specification Group Radio Access Network; Physical Layer Aspects for Evolved UTRA (Release 7)*, 3GPP TR 25.814 V1.3.0 (May 2006).

(Continued)

*Primary Examiner*—Tri H Phan
(74) *Attorney, Agent, or Firm*—Woodcock Washburn LLP

(57) ABSTRACT

A multiple-input multiple-output (MIMO) scheme uses precoding and feedback in a wireless communication system including a transmitter and a receiver. The system may use either a single codeword (SCW) or a double codeword (DCW). The precoding scheme is based on transmit beamforming (TxBF). Combined differential and non-differential feedback with periodic resetting is considered.

58 Claims, 9 Drawing Sheets

FOREIGN PATENT DOCUMENTS

| WO | 02/078211 | 10/2002 |
| WO | 03/041300 | 5/2003 |
| WO | 2006/053340 | 5/2006 |

OTHER PUBLICATIONS

Grieco et al., *Uplink Single-User MIMO for 3GPP LTE*, InterDigital Communications Corp., (Melville, NY), (2007).

Intel Corporation, *Performance and Complexity of Scaleable Pre-Coded MIMO (LLS & SLS)*, 3GPP TSG RAN WG1 #44bis, R1-060868, (Athens, Greece Mar. 27-31, 2006).

Interdigital Communications Corporation, *Extension of Uplink MIMO SC-FDMA With Preliminary Simulation*, 3GPP TSG RAN WG1 #44, R1-060365, (Denver Feb. 13-17, 2006).

Interdigital Communications Corporation, *Uplink MIMO SC-FDMA With Adaptive Modulation and Coding*, 3GPP TSG RAN WG1 #44bis, R1-060853, (Athens, Greece Mar. 27-31, 2006).

Nortel, *UL Virtual MIMO Transmission for E-UTRA*, 3GPP TSG-RAN1 Meeting #42bis, R1-0501162, (San Diego Oct. 10-14, 2005).

Michalke et al., "Efficient Tracking of Eigenspaces and Its Application to Eigenbeamforming", 14th IEEE Proceedings on Personal, Indoor and Mobile Radio Communications, 2003. PIMRC 2003, vol. 3, No. 7-10, pp. 2847-2851, (Sep. 2003).

Seeger et al., "Advanced Eigenbeamforming for the 3GPP UMTS FDD Downlink", In Processing of International ITG/IEEE Workshop on Smart Antennas (WSA 2005), (Duisburg, Germany, Apr. 2005).

Nortel, "Error Free Encoder for a Differential Code," 3GPP TSG-RAN Working Group 1 Meeting #44, R1-060661, (Feb. 17, 2006).

* cited by examiner

//////
METHOD AND APPARATUS FOR PROVIDING EFFICIENT PRECODING FEEDBACK IN A MIMO WIRELESS COMMUNICATION SYSTEM

CROSS REFERENCE TO RELATED APPLICATIONS

This application claims the benefit of U.S. Provisional Application No. 60/838,273 filed Aug. 17, 2006, U.S. Provisional Application No. 60/839,195 filed Aug. 21, 2006 and U.S. Provisional Application No. 60/892,719 filed Mar. 2, 2007, which are incorporated by reference as if fully set forth.

FIELD OF INVENTION

The present invention relates generally to wireless communication systems. More particularly, the present invention relates to a method and apparatus for performing efficient multiple input multiple output (MIMO) precoding using differential feedback combined with group feedback which results in significantly reduced feedback overhead in a single carrier frequency division multiple access (SC-FDMA) system.

BACKGROUND

MIMO is considered essential for evolved universal terrestrial radio access (E-UTRA) to provide high data rate and increased system capacity for an orthogonal frequency division multiple access (OFDMA) downlink (DL). It is desirable to use MIMO for an SC-FDMA uplink (UL) for the same reasons. A significant improvement in data rates and throughput using MIMO precoding for SC-FDMA for the uplink has been shown. E-UTRA supports an instantaneous uplink peak data rate of 50 Mb/s within a 20 MHz uplink spectrum allocation (2.5 bps/Hz) assuming a 16-QAM modulation.

When practical coding rates (e.g. 1/2) are used, the instantaneous uplink peak data rate is much less than 50 Mb/s. To achieve this data rate while using practical coding rates, utilization of a MIMO configuration is necessary. It has also been noted that to achieve the highest throughput in uplink transmission, the use of precoding is a necessity. Using MIMO for an SC-FDMA uplink (UL) requires the use of at least two transmitters, one for each uplink MIMO antenna. An additional advantage to having two or more transmitters in the WTRU is the possibility of using beamforming to enhance multi-user MIMO, and also transmit diversity schemes such as Space Time (ST)/Frequency Decoding (FD).

The efficient feedback can reduce feedback overhead or improve performance. A potential feedback overhead reduction is obtainable when using Jacobi rotation for eigen-basis feedback. Additional overhead reduction is achievable using a differential feedback by an iterative approach for the Jacobi transform to track the delta of the eigen-basis and then provide feedback to the new eigen-basis.

It would be desirable to use differential feedback and iterative Jacobi rotation for potential feedback overhead reduction and performance improvement. Iterative Jacobi rotation-based feedback is a potential solution for a two or more transmit antenna MIMO proposal.

SUMMARY

The present invention evaluates performance of a MIMO precoding scheme and considers the effects of quantization, group feedback and feedback delay for MIMO precoding in a wireless communication system including a transmitter and a receiver. The system may use either a single codeword configuration (SCW) or a double codeword (DCW) configuration. Singular value decomposition (SVD) can be used to generate the precoding matrix. The quantization for MIMO precoding or transmit eigen-beamforming (TxBF) can be codebook-based. Group feedback considers one feedback per group of subcarriers or resource blocks (RBs). A codebook-based MIMO precoding scheme using combined differential and non-differential feedback is also provided. The precoding scheme may only use non-differential feedback.

The present invention provides a precoding feedback scheme based on Jacobi rotations for uplink MIMO. The present invention can also be applied to downlink MIMO where OFDM(A) is used. Combined differential and non-differential feedback with periodic resetting is considered. It is shown that the differential feedback with proper resetting improves performance. Differential feedback requires considerably less, about 33%, feedback overhead than non-differential feedback while the performance is maintained.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Figure 1:
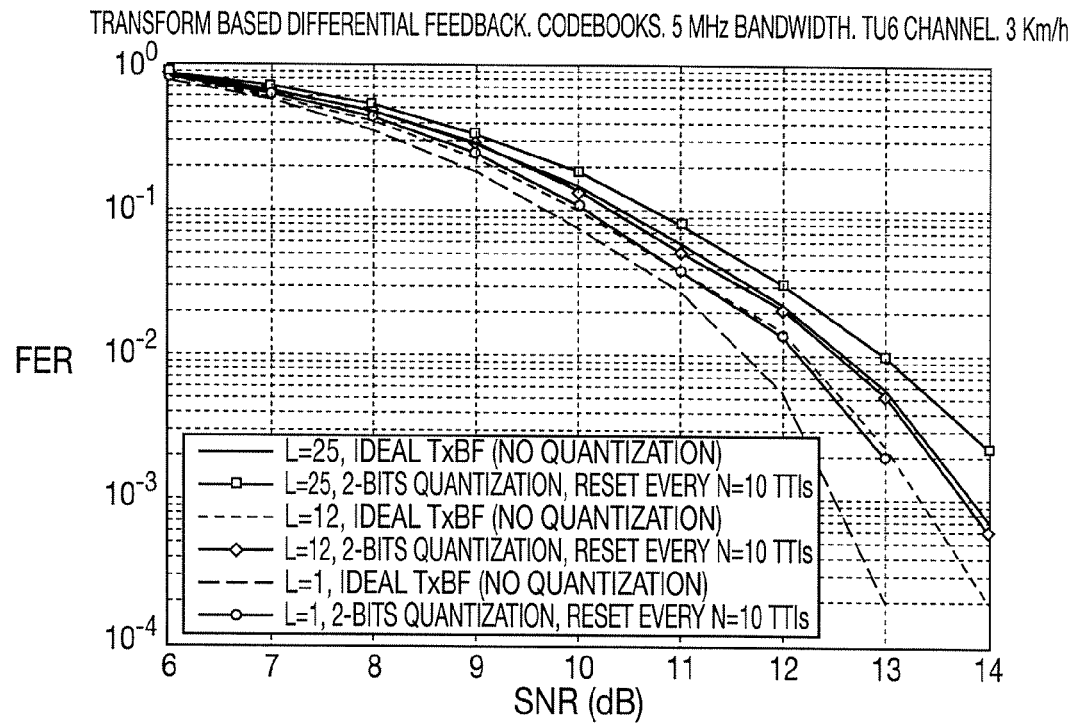
FIG. 1 is a graph showing the frame error rate (FER) versus signal-to-noise ratio (SNR) using a Typical Urban 6 (TU-6) channel model. A comparison of ideal and quantized feedback is given.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Non-Differential Feedback

A Jacobi rotation is used to perform matrix diagonalization. The channel response matrix H (or the estimate of channel response matrix) can be decomposed into:

$$H = UDV^H;  \quad\quad \text{Equation (1)}$$

where U and V are unitary matrices, i.e., $U^H U = I$ and $V^H V = I$. D is a diagonal matrix that has singular values in the diagonal, V is the eigen-matrix (consisting of eigen-vectors) and can be used as a precoding matrix at the transmitter, and $V^H$ is the Hermetian of a precoding matrix (eigen-matrix) V. The channel correlation matrix R is defined as:

$$R = H^H H;  \quad\quad \text{Equation (2)}$$

which is the product of the Hermitian transpose of the channel response matrix H and the channel response matrix H itself. The channel correlation matrix R can be decomposed into:

$$R = VD^2 V^H.  \quad\quad \text{Equation (3)}$$

Jacobi rotation is used to perform the matrix diagonalization on the channel correlation matrix R such that:

$$D^2 = J^H R J.  \quad\quad \text{Equation (4)}$$

Diagonalization is a process of transforming any arbitrary matrix into a diagonal matrix. Diagonalization is typically used in wireless communications and signal processing applications to separate multiple signals and/or to separate the desired signal and interference. Equation (4) describes the process of diagonalizing the channel correlation matrix R into a diagonal matrix $D^2$. In Equation (4), the Jacobi rotation matrix J is multiplied with the channel correlation matrix R from the right-hand side, and the Hermitian transpose of Jacobi rotation matrix J is multiplied with the channel correlation matrix R from left-hand side. The resulting matrix is $D^2$ which is a diagonal matrix. When comparing Equations (1) and (3), it is observed that diagonalizing the channel response matrix H to find the eigen-matrix V is equivalent to diagonalizing the channel correlation matrix R to find eigen-matrix V. Equation (3) can be rewritten as:

$$V^H R V = D^2. \quad\quad \text{Equation (5)}$$

When comparing equations (4) and (5), it is observed that the Jacobi matrix J becomes the eigen-matrix V when the channel correlation matrix R is diagonalized using eigenvalue decomposition (or SVD) and Jacobi rotation for the diagonalization transform. The Jacobi rotation transform or precoding matrix (or the estimate of Jacobi rotation transform or precoding matrix) for a 2×2 configuration is represented as:

$$J(\hat{\theta}, \hat{\phi}) = \begin{bmatrix} \cos(\hat{\theta})e^{j\hat{\phi}} & \sin(\hat{\theta})e^{j\hat{\phi}} \\ -\sin(\hat{\theta}) & \cos(\hat{\theta}) \end{bmatrix}; \quad\quad \text{Equation (6a)}$$

where $\hat{\theta}$ and $\hat{\phi}$ are estimates of parameters for the Jacobi rotation. The parameters $\hat{\theta}$ and $\hat{\phi}$ can be obtained by the equations 9 and 10. The parameters $\hat{\theta}$ and $\hat{\phi}$ can also be obtained by solving the equation 6b below.

$$V = \begin{bmatrix} v_{11} & v_{12} \\ v_{21} & v_{22} \end{bmatrix} = J(\hat{\theta}, \hat{\phi}) = \begin{bmatrix} \cos(\hat{\theta})e^{j\hat{\phi}} & \sin(\hat{\theta})e^{j\hat{\phi}} \\ -\sin(\hat{\theta}) & \cos(\hat{\theta}) \end{bmatrix}. \quad\quad \text{Equation (6b)}$$

The precoding matrix (eigen-matrix) V is represented as:

$$V = \begin{bmatrix} v_{11} & v_{12} \\ v_{21} & v_{22} \end{bmatrix}. \quad\quad \text{Equation (7)}$$

The channel correlation matrix R is represented as:

$$R = \begin{bmatrix} r_{11} & r_{12} \\ r_{21} & r_{22} \end{bmatrix}. \quad\quad \text{Equation (8)}$$

For non-differential feedback, the precoding matrix V feedback is performed. Since the precoding matrix V is equivalent to the Jacobi rotation matrix J by comparing Equations (4) and (5) as discussed in previous sections, the precoding matrix V can be transformed into the Jacobi rotation matrix J. Feeding back the precoding matrix V is equivalent to feeding back the Jacobi rotation matrix J or feeding back the parameters $\hat{\theta}$ and $\hat{\phi}$ of the Jacobi rotation matrix. The feedback of the precoding matrix V can be represented by two elements: $\hat{\theta}$ and $\hat{\phi}$, instead of v11, v12, v21, and v22 (the elements or the eigen-vectors of the precoding matrix V) or r11, r12, r21, and r22 (the elements of the channel correlation matrix R). The feedback of parameters of the matrix transform (such as feedback of $\hat{\theta}$ and $\hat{\phi}$) is more efficient than the feedback of the entire precoding matrix, or the precoding vectors themselves (such as the feedback of the precoding matrix V or equivalently its elements v11, v12, v21, and v22, or the feedback of the channel correlation matrix R or equivalently its elements r11, r12, r21, and r22).

The Jacobi transform parameters $\hat{\theta}$ and $\hat{\phi}$ can be computed using the following two equations:

$$\tan(\hat{\theta})^2 + \frac{(r_{22} - r_{11})}{|r_{12}|} \tan(\hat{\theta}) - 1 = 0; \text{ and} \quad\quad \text{Equation (9)}$$

$$e^{j\hat{\phi}} = \frac{r_{12}}{|r_{12}|}; \quad\quad \text{Equation (10)}$$

where $r_{ij}$ is the element of channel correlation matrix R that corresponds to the $i^{th}$ row and $j^{th}$ column.

To further reduce feedback overhead, differential processing is introduced in which only the changes or differences of the parameters of matrix transform ($\Delta\hat{\theta}$ and $\Delta\hat{\phi}$) between updates are computed, and fed back.

To avoid error accumulation and propagation introduced by differential processing, an approach that combines differential and non-differential feedback is considered in which a differential feedback with periodic error reset is proposed.

Differential Feedback

The differential feedback using an iterative Jacobi transform is proposed. For feedback instance n, the Jacobi rotation J(n) is applied on channel correlation matrix R and is expressed by:

$$J(n)^H R(n) J(n) = D^2. \qquad \text{Equation (11)}$$

For the next feedback instance n+1, if the Jacobi rotation matrix is not updated, diagonalization of matrix R using Jacobi rotation of feedback instance n can be expressed by:

$$J(n)^H R(n+1) J(n) = \tilde{D}^2. \qquad \text{Equation (12)}$$

$\tilde{D}^2$ is not diagonal. However, when the channel changes slowly, $\tilde{D}^2$ is close to diagonal. When the channel is not changed, $\tilde{D}^2$ is diagonal. When MIMO channels change, $\tilde{D}^2$ is no longer diagonal. The precoding matrix and, therefore, the Jacobi rotation matrix, needs to be updated for correct diagonalization. Call $\Delta J$ (or $\Delta J(n)$) the differential precoding matrix (delta precoding matrix) that represents the delta of the feedback matrix update at feedback instance n. The parameters $\Delta\hat{\theta}$ and $\Delta\hat{\phi}$ for Jacobi rotation transform of delta precoding matrix are sent back to the transmitter from the receiver. This is in contrast to the non-differential feedback in which a full precoding matrix instead of the delta precoding matrix is fed back. The parameters $\hat{\theta}$ and $\hat{\phi}$ for Jacobi rotation transform of the full precoding matrix are fed back to the transmitter. When the channel changes, the Jacobi rotation or transform needs to be updated for correct diagonalization:

$$\Delta J(N)^H [J(n)^H R(n+1) J(n)] \Delta J(n) = \Delta J(n)^H \tilde{D}^2 \Delta J(n) = D^2; \qquad \text{Equation (13)}$$

where $\Delta J(n)$ is the delta of the feedback update at feedback instance n. The differential feedback or delta feedback $\Delta J(n)$ is estimated and computed at the receiver and is sent back to the transmitter from the receiver for updating the precoding matrix J(n) for the next precoding process J(n+1) at transmitter (and/or at the receiver if needed).

The differential feedback or delta feedback $\Delta J$ can be obtained from $\tilde{D}^2$ where:

$$\tilde{D}^2 = \begin{bmatrix} d_{11} & d_{12} \\ d_{21} & d_{22} \end{bmatrix}. \qquad \text{Equation (14)}$$

The following Equations (15) and (16) can be used to obtain the differential precoding matrix $\Delta J$, (i.e., to obtain $\Delta\hat{\theta}$ and $\Delta\hat{\phi}$):

$$\tan(\Delta\hat{\theta})^2 + \frac{(d_{22} - d_{11})}{|d_{12}|} \tan(\Delta\hat{\theta}) - 1 = 0; \text{ and} \qquad \text{Equation (15)}$$

$$e^{j\Delta\hat{\phi}} = \frac{d_{12}}{|d_{12}|}. \qquad \text{Equation (16)}$$

Alternatively, the differential feedback $\Delta J$ can be computed at the receiver by multiplying the Hermitian transpose of the previous precoding matrix J(n) with the precoding matrix J(n+1) by:

$$\Delta J(n) = J(n)^H J(n+1); \qquad \text{Equation (17)}$$

where J(n+1) can be computed from the correlation matrix R(n+1) at the receiver as described in Equations (2) and (4) for feedback instance n+1. The transmitter receives the feedback $\Delta J(n)$ and uses it for the precoding matrix update for J(n+1). Note that the precoding matrix is denoted as J (which is equal to V as J and V are equivalent as discussed in previous sections). The previous precoding matrix J(n) at the transmitter is updated to obtain the next precoding matrix J(n+1). The transmitter first receives and decodes the feedback bits, and translates those feedback bits to a delta precoding matrix $\Delta J$. This can be performed at the transmitter by multiplying the previous precoding matrix J(n) that is used at the transmitter with the differential precoding matrix $\Delta J(n)$ that is received, decoded and translated by the transmitter from the receiver by:

$$J(n+1) = J(n) \cdot \Delta J(n). \qquad \text{Equation (18)}$$

J(n+1) can be computed from R(n+1), and R(n+1) is calculated from H(n+1).

Diagonalization is achieved using an updated differential precoding matrix $\Delta J$, as described by Equation (13), and the resulting equation can be rewritten as:

$$J(n+1)^H R(n+1) J(N+1) = D^2; \qquad \text{Equation (19)}$$

where J(n+1) and $\Delta J$ are related by Equation (18).

Combined Differential and Non-Differential Feedback

Note that both combined differential and non-differential feedback may be used with group feedback. Group feedback assumes that adjacent sub-carriers or resource block (RB) will exhibit similar fading behavior and, as such, these techniques may be applied to them jointly.

In general, differential feedback may be more suitable for low speed channels and non-differential feedback may be suitable for high speed channels. A combined differential and non-differential feedback may be considered for feedback overhead reduction and performance improvement.

Differential feedback can be reset every N transmission timing intervals (TTIs), every N feedback intervals, every certain period of time or aperiodically for avoiding error accumulation or propagation due to differential processing. N is a predetermined integer. At each reset, non-differential feedback is used. Non-differential feedback occurs every N TTIs or every N feedback intervals and differential feedback is used for the remaining TTIs or feedback intervals. At the resetting period, the full precoding matrix is fed back while, between the resets or between non-differential feedbacks, only the delta precoding matrix is fed back.

The feedback overhead can be reduced. For differential feedback, less bits, (e.g., 2 bits), are required for quantization. For non-differential feedback, more bits, (e.g., 3 bits), are required for quantization.

For example a codebook consisting of eight codewords which requires three (3) feedback bits for quantization is used for non-differential feedback, while four codewords are used for differential feedback, which requires fewer feedback bits (2 bits). The feedback can be based on averages over multiple resource blocks (RBs), (e.g., 2, 5, 6, 10 RBs), where a RB is defined as a block with multiple subcarriers (e.g., 12 or 25 subcarriers).

Two codebooks are preferably used. However, any other number of codebooks may be used. A differential codebook, used for quantization, concentrates on the origin of the ($\theta$, $\phi$) plane for differential feedback, while a non-differential codebook is uniform with codewords evenly distributed. Any desirable number of codewords may be included in a codebook. A combined differential and non-differential feedback can reduce the feedback overhead and improve the performance for the MIMO precoding.

Simulation Assumptions

The simulation assumption and parameters used are given in Table 1 below.

TABLE 1

| Parameter | Assumption |
|---|---|
| Carrier frequency | 2.0 GHz |
| Symbol rate | 4.096 million symbols/sec |
| Transmission bandwidth | 5 MHz |
| TTI length | 0.5 ms (2048 symbols) |
| Number of data blocks per TTI | 6 |
| Number of data symbols per TTI | 1536 |
| Fast Fourier transform (FFT) block size | 512 |
| Number of occupied subcarriers | 256 |
| Cyclic Prefix (CP) length | 7.8125 μsec (32 samples) |
| Channel model | Typical Urban (TU6), SCME-C |
| Antenna configurations | 2 × 2 (MIMO) |
| Fading correlation between transmit/receive antennas | $\rho = 0$ for TU6, and SCME-C |
| Moving speed | 3 km/hr, 30 km/hr, 120 km/hr |
| Data modulation | QPSK and 16QAM |
| Channel coding | Turbo code with soft-decision decoding |
| Coding rate | ½ and ⅓ |
| Equalizer | LMMSE |
| Group feedback | One feedback per 1, 12 and 25 subcarriers |
| Feedback error | None (Assumed ideal) |
| Feedback delay | 2 and 6 TTIs |
| Channel Estimation | Ideal channel estimation |

Simulation Results and Discussions

FIG. 1 shows the performance of MIMO precoding for a TU6 channel model and vehicle speed at 3 km/hr. The performance of MIMO precoding with group feedback of different group sizes is compared. No group feedback is feedback per subcarrier which requires the highest feedback overhead. Group feedback uses one feedback for every L subcarriers. About 0.3 dB degradation is observed for group feedback using one feedback per 12 subcarriers with respect to the performance of no group feedback, i.e., L=1. About 0.8 dB degradation in performance is observed for group feedback using one feedback per 25 subcarriers with respect to no group feedback.

In addition, the performance of MIMO precoding with and without quantization is compared in FIG. 1. With differential feedback that uses 2 bits per feedback group, about 0.3 dB degradation results from quantization for all group feedback sizes, L=1, 12 and 25 subcarriers is observed. The feedback was updated every TTI and was reset every 10 TTIs.

Figure 2:
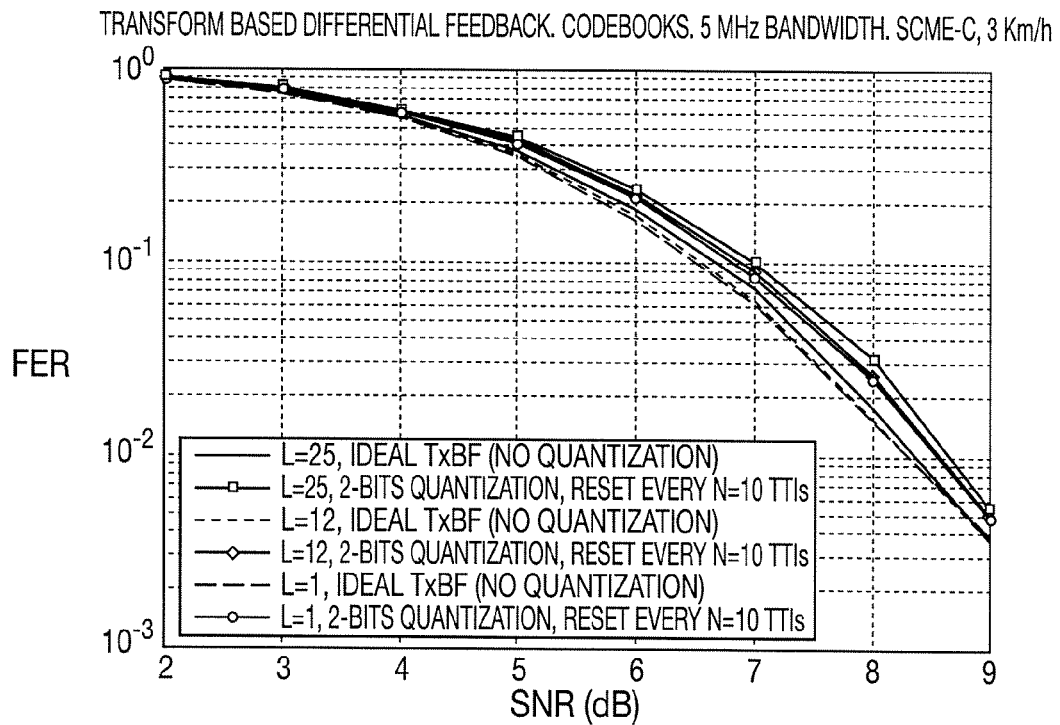
FIG. 2 is a graph showing the frame error rate (FER) versus signal-to-noise ratio (SNR) using a Spatial Channel Model Extended C (SCME-C) channel model. A comparison of ideal and quantized feedback is given. As observed there is less loss from quantized feedback for the SCME-C channel model than the TU-6 channel model. This is due to correlation properties of the SCME-C channel model.

FIG. 2 shows the performance of MIMO precoding using group feedback and codebook quantization for an SCME-C channel and vehicle speed at 3 km/hr. About 0.1 dB degradation is observed for group feedback using one feedback per 12 subcarriers with respect to the performance of no group feedback, i.e., L=1. About 0.2 dB degradation is observed for group feedback using one feedback per 25 subcarriers with respect to no group feedback. In addition about 0.3 dB degradation due to quantization that uses 2 bits per feedback group is observed.

Figure 3:
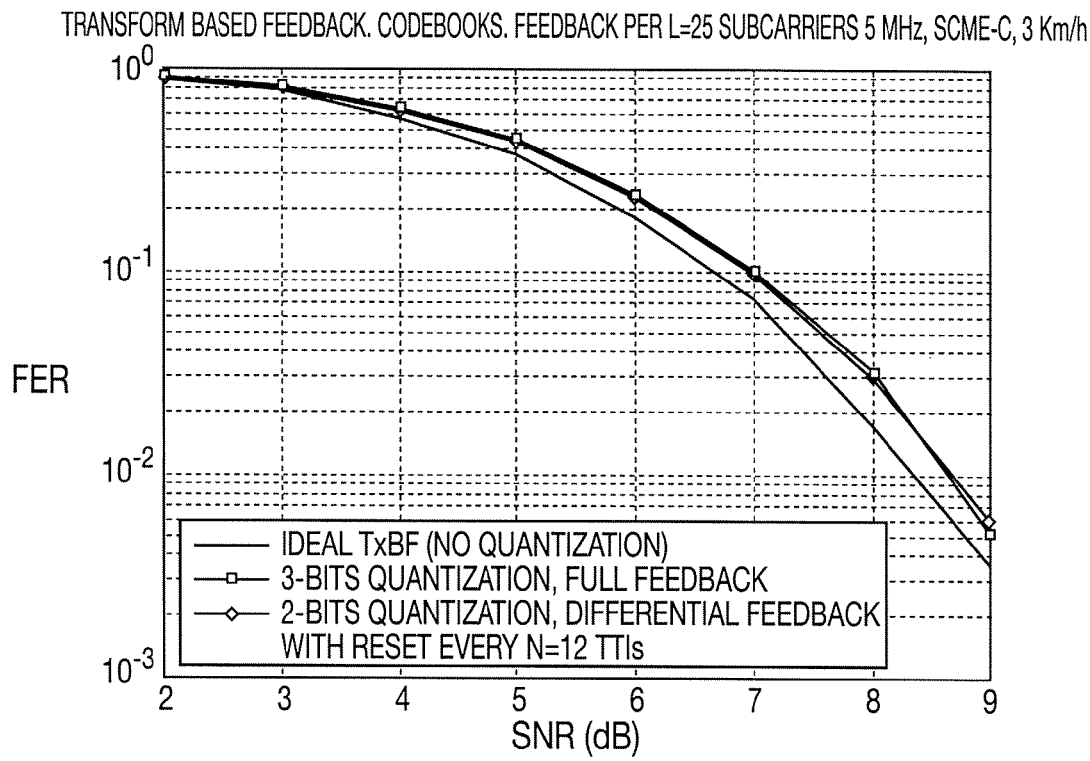
FIG. 3 is a graph comparing differential feedback and non-differential feedback.

FIG. 3 shows the performance comparison for MIMO precoding using differential and non-differential feedback. The performance of combined differential and non-differential feedback that uses a mixed 2 bits/3 bits scheme is compared against non-differential feedback using 3 bits. Combined differential and non-differential feedback uses 2-bit quantization with 3-bit quantization at each resetting period.

It can be observed that the performance of differential feedback using fewer bits (2 bits) with a proper resetting interval for differential processing is similar to the performance of non-differential feedback using full feedback and more bits (3 bits). The combined differential and non-differential feedback can reduce the feedback overhead by as much as 33% as compared to feedback overhead of non-differential feedback, depending on the iteration interval and reset period. About 0.3-0.4 dB degradation in performance for precoding using quantization with respect to ideal precoding/TxBF with no quantization.

Figure 4:
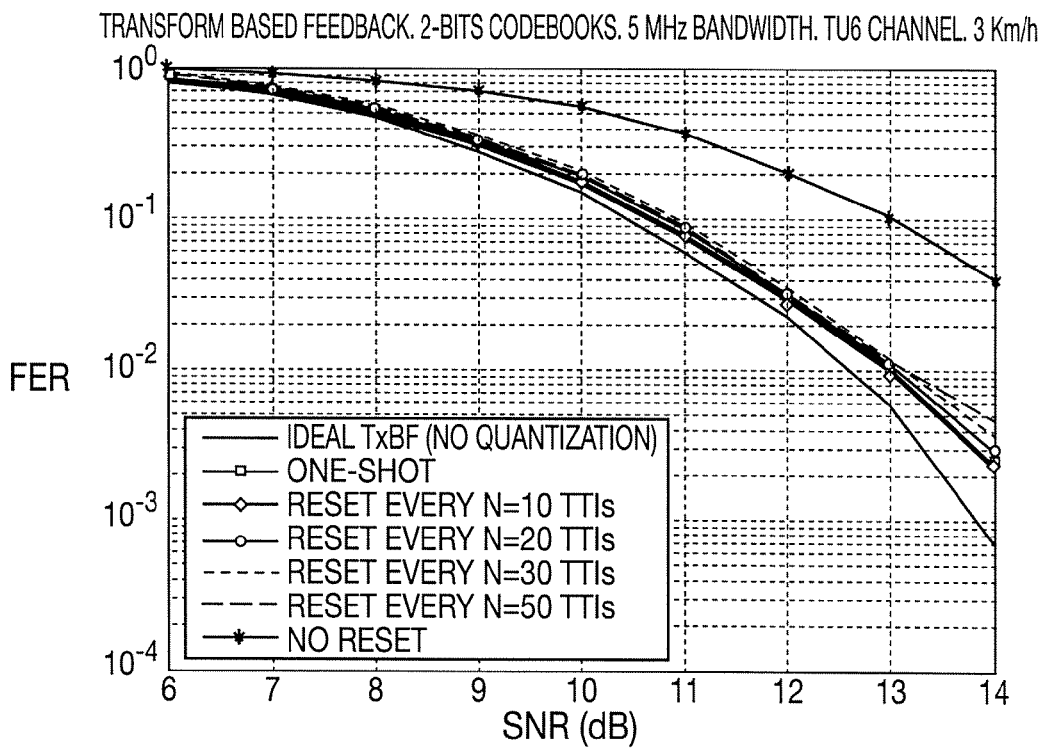
FIG. 4 is a graph of feedback using different resetting intervals.

FIG. 4 shows the performance of MIMO precoding using differential feedback with resetting. It can be observed that the performance of differential feedback every TTI with proper resetting may improve the performance by 2 dB. This is because the precoding error due to quantization may accumulate or propagate for differential feedback. The resetting process corrects the error, thus improving the performance.

The performance of differential feedback with different resetting intervals of N=10, 20, 30 and 50 TTIs are compared. Performance degradation is negligible; about 0.1 dB degradation in performance is observed with the longest resetting interval of 50 TTIs. Note that this does not account for the effects of possible feedback bit errors; however, we believe that such errors will be rare because of error protection.

Figure 5:
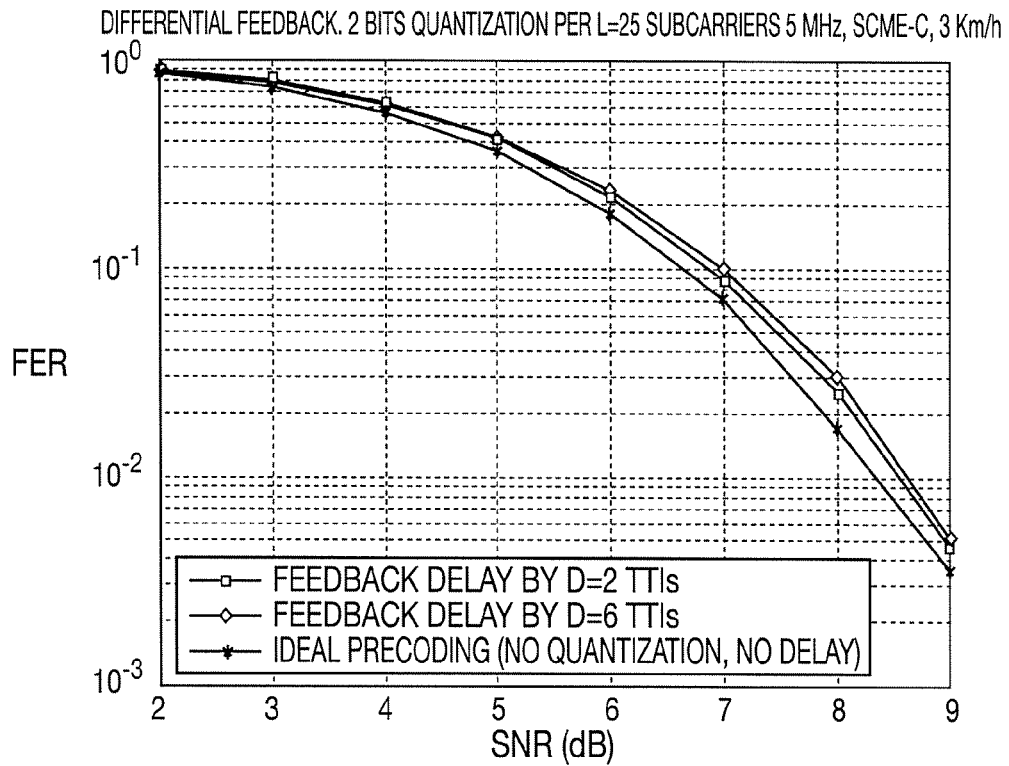
FIG. 5 is a graph comparing differential feedback with feedback delay for SCME-C at a lower speed.

FIG. 5 shows the performance of MIMO precoding using differential feedback with feedback delay for an SCME-C channel and vehicle speed 3 km/h. The combined performance degradation for 2-bit quantization and feedback delay is about 0.3 dB for feedback delay of 2 TTIs and about 0.4 dB for feedback delay of 6 TTIs with respect to no quantization and no feedback delay.

Figure 6:
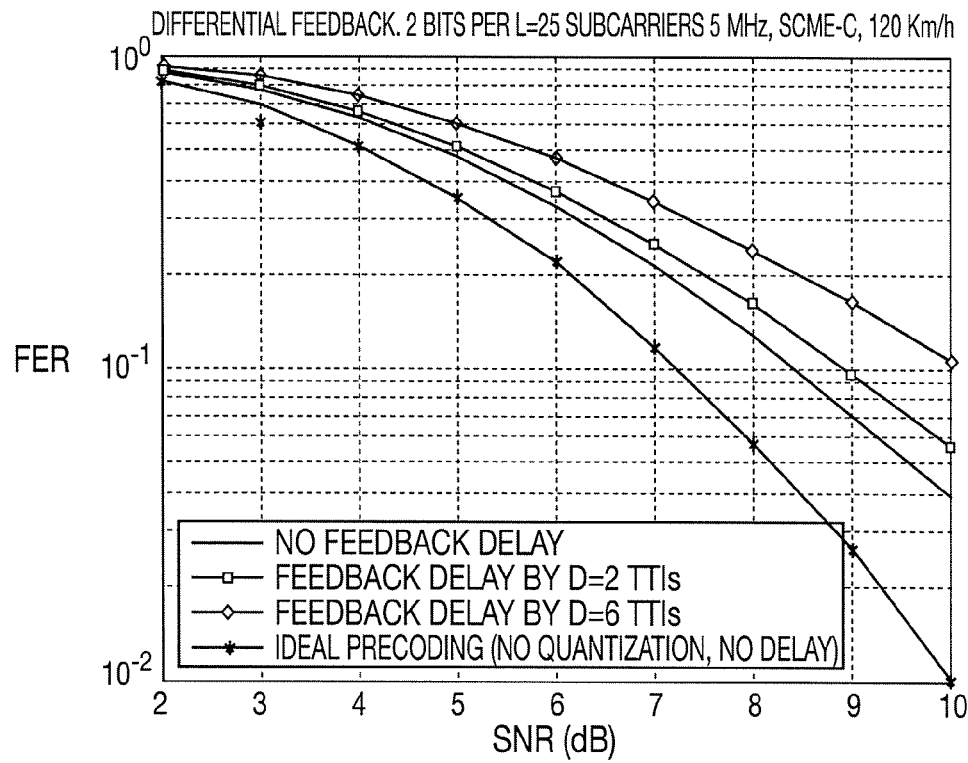
FIG. 6 is a graph of differential feedback and feedback delay for SCME-C at a high speed.

FIG. 6 shows the performance of MIMO precoding using differential feedback with feedback delay for an SCME-C channel and a vehicle speed of 120 km/h. It can be observed that about 0.6 dB degradation results from 2 TTI feedback delay and about 1.5 dB degradation results from 6 TTI feedback delay with respect to the performance of no feedback delay. When compared to the performance of ideal precoding with no quantization and no feedback, the performance of differential feedback has about 1.7 dB and 2.7 dB degradation for combined quantization and feedback delay of 2 TTIs and 6 TTIs, respectively.

Figure 7:
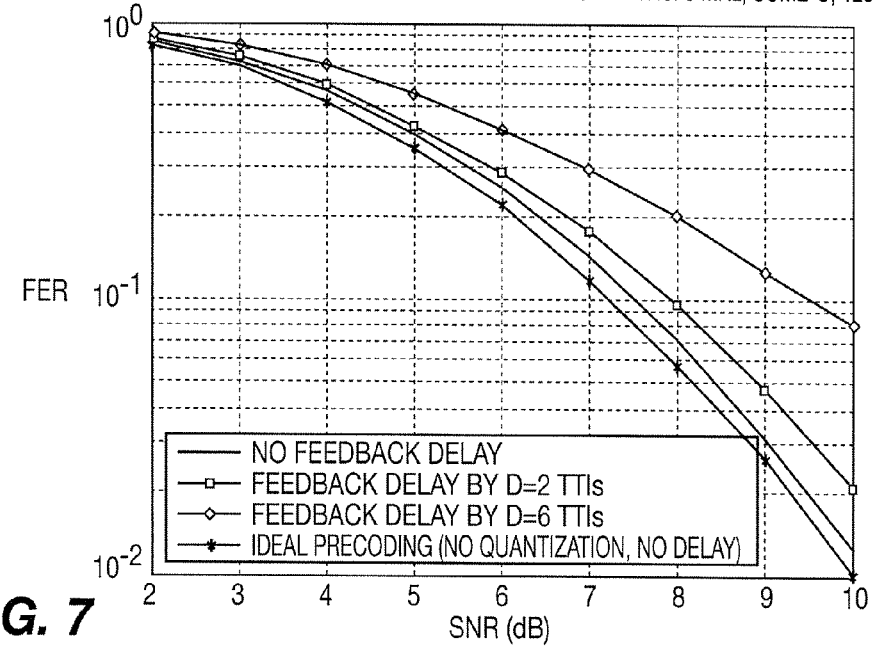
FIG. 7 is a graph of non differential feedback and feedback delay for SCME-C at a high speed.

FIG. 7 shows the performance of MIMO precoding using non-differential feedback for an SCME-C channel and a vehicle speed of 120 km/h. It can be observed that the performance degrades about 0.5 dB for 2 TTI feedback delay and about 2 dB for 6 TTI feedback delay as compared to the performance of no feedback delay. When compared with the performance of ideal precoding with no quantization and no feedback, the performance of differential feedback has about 0.7 dB and 2.2 dB degradation for combined quantization and feedback delay of 2 TTIs and 6 TTIs, correspondingly. A shorter feedback delay is obviously preferable for such high speed channels to reduce the performance loss due to speed.

MIMO precoding using differential feedback, non-differential feedback, and group feedback can be applied to uplink or downlink MIMO for SC-FDMA or OFDMA air interfaces. The following shows the differential feedback work for uplink MIMO with a SC-FDMA air interface. These techniques may be extended to any number of antennas greater than one.

Architecture

Figure 8B:
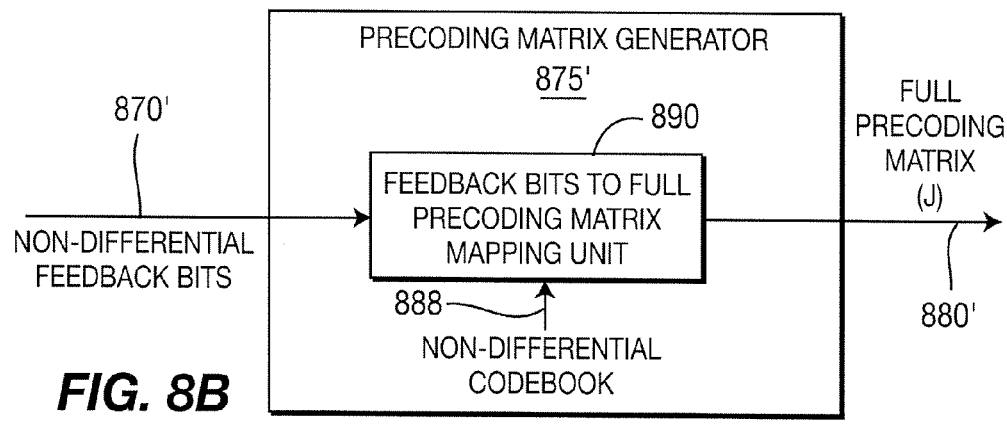
FIGS. 8B and 8C show details of the precoding matrix generator of FIG. 8A.
Figure 8C:
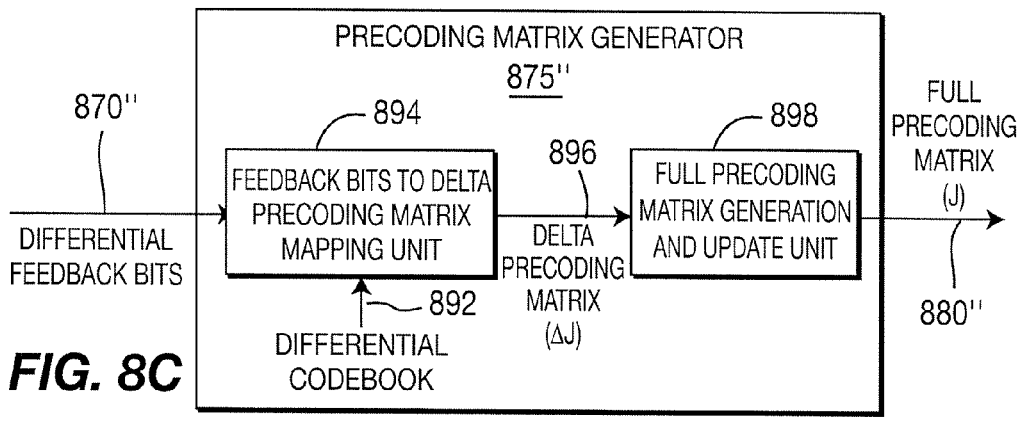
Figure 8A:
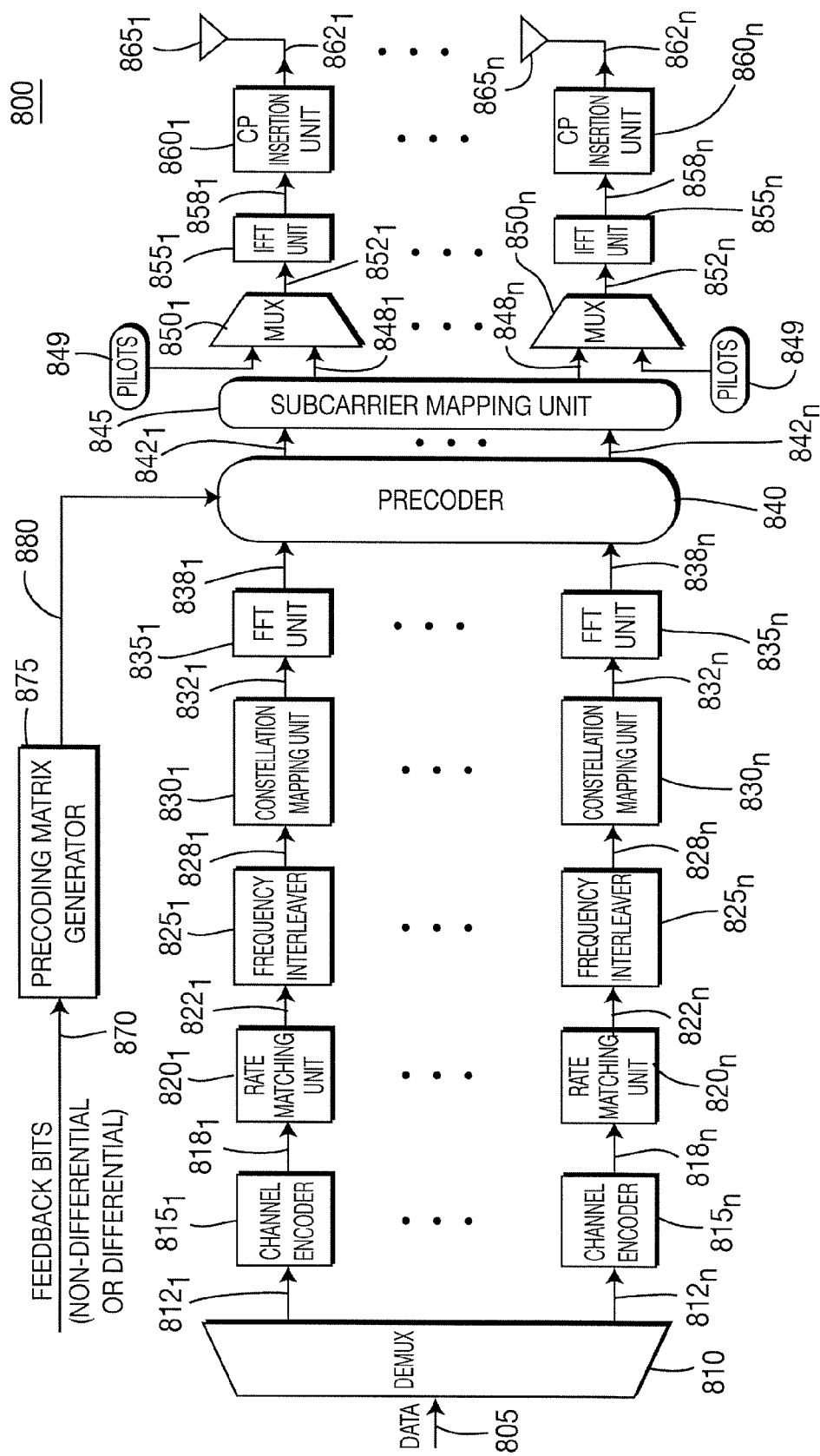
FIG. 8A is a block diagram of a transmitter including a precoding matrix generator for processing differential or non-differential feedback bits in accordance with the present invention.

FIG. 8A is a block diagram of a transmitter 800 for a DCW configuration of uplink MIMO using precoding with dual transmit chains in accordance with the present invention. In the case of an SCW, the coded data is split into parallel streams, each with a different modulation. The transmitter 800 may be an eNodeB or a base station, (i.e., the eNodeB in LTE terminology).

Referring to FIG. 8A, the transmitter 800 includes a demultiplexer 810, a plurality of channel encoders $815_1$-$815_n$, a plurality of rate matching units $820_1$-$820_n$, a plurality of frequency interleavers $825_1$-$825_n$, a plurality of constellation mapping units $830_1$-$830_n$, a plurality of fast Fourier transform (FFT) units $835_1$-$835_n$, a precoder 840, a subcarrier mapping unit 845, a plurality of multiplexers $850_1$-$850_n$, a plurality of inverse FFT (IFFT) units $855_1$-$855_n$, a plurality of cyclic prefix (CP) insertion units $860_1$-$860_n$, a plurality of antennas $865_1$-$865_n$ and a precoding matrix generator 875. It should be noted that the configuration of the transmitter 800 is provided as an example, not as a limitation, and the processing may be performed by more or less components and the order of processing may be switched.

Transmit data 805 is first demultiplexed into a plurality of data streams $812_1$-$812_n$ by the demultiplexer 810. Adaptive modulation and coding (AMC) may be used for each of the data streams $812_1$-$812_n$. Bits on each of the data streams $812_1$-$812_n$ are then encoded by each of the channel encoders $815_1$-$815_n$ to generate encoded bits $818_1$-$818_n$, which are then punctured for rate matching by each of the rate matching units $820_1$-$820_n$. Alternatively, multiple input data streams may be encoded and punctured by the channel encoders and rate matching units, rather than parsing one transmit data into multiple data streams.

The encoded data after rate matching $822_1$-$822_n$ is preferably interleaved by the interleavers $825_1$-$825_n$. The data bits after interleaving $828_1$-$828_n$ are then mapped to symbols $832_1$-$832_n$ by the constellation mapping units $830_1$-$830_n$ in accordance with a selected modulation scheme. The modulation scheme may be binary phase shift keying (BPSK), quadrature phase shift keying (QPSK), 8 PSK, 16 quadrature amplitude modulation (QAM), 64 QAM, or similar modulation schemes. Symbols $832_1$-$832_n$ on each data stream are processed by the FFT units $835_1$-$835_n$, which outputs frequency domain data $838_1$-$838_n$.

The precoding matrix generator 875 uses non-differential or differential feedback bits, (or feedback channel metrics), to generate a set of precoding weights 880 (i.e., a precoding matrix), which are fed to the precoder 840 for performing precoding on the frequency domain data streams $838_1$-$838_n$.

FIGS. 8B and 8C show details of the precoding matrix generator 875 of the transmitter 800 of FIG. 8A.

If the feedback bits 870 include non-differential feedback bits 870', the precoding matrix generator 875 may be configured as the precoding generator 875' shown in FIG. 8B. The precoding matrix generator 875' includes a feedback bits to full precoding matrix mapping unit 890 that translates the non-differential feedback bits 870' into a full precoding matrix 880' (J) using a non-differential codebook 888.

If the feedback bits 870 include differential feedback bits 870", the precoding matrix generator 875 may be configured as the precoding matrix generator 875" shown in FIG. 8C. The precoding matrix generator 875" includes a feedback bits to delta precoding matrix mapping unit 894 that translates the differential feedback bits 870" into a delta precoding matrix 896 ($\Delta J$) using a differential codebook 892. The delta precoding matrix 896 is represented by $\Delta\hat{\theta}$ and $\Delta\hat{\phi}$. The precoding matrix generator 875" further includes a full precoding matrix generation and update unit 898 that translates the delta precoding matrix 896 to a full precoding matrix 880" (J), which is represented by $\hat{\theta}$ and $\hat{\phi}$.

Referring back to FIG. 8A, the precoder 840 applies the weights to each stream of frequency domain data $838_1$-$838_n$, similar to spatial spreading or beamforming, and outputs precoded data streams $842_1$-$842_n$. The subcarrier mapping unit 845 maps the precoded data streams $842_1$-$842_n$ to the subcarriers that are assigned for the user. The subcarrier mapping may be either distributed subcarrier mapping or localized subcarrier mapping.

The subcarrier mapped data $842_1$-$842_n$ is multiplexed with pilots 849 by the multiplexers $850_1$-$850_n$, the outputs $852_1$-$852_n$ of which are then processed by the IFFT units $855_1$-$855_n$. The IFFT units $855_1$-$855_n$ output time domain data $858_1$-$858_n$. A CP is added to each time domain data stream $858_1$-$858_n$ by the CP insertion units $860_1$-$860_n$. The time domain data with CP $862_1$-$862_n$ is then transmitted via the antennas $865_1$-$865_n$.

Figure 9A:
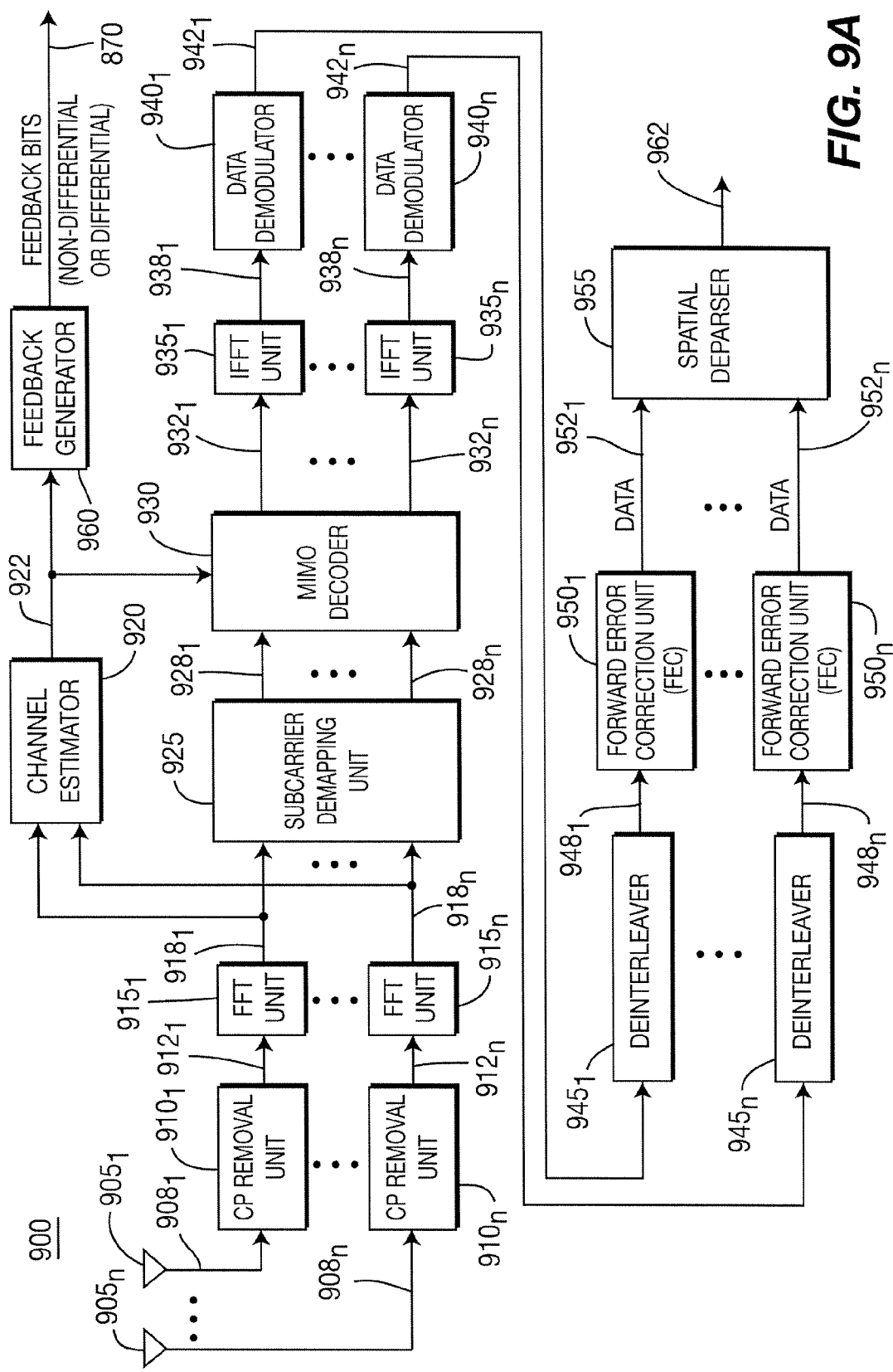
FIG. 9A is a block diagram of a receiver including a feedback generator that generates the feedback bits processed by the precoding matrix generator of the transmitter of FIG. 8A in accordance with the present invention.

FIG. 9A is a block diagram of a receiver 900 that receives and processes signals transmitted by the transmitter 800 of FIG. 8A in accordance with the present invention. A single decoder may be used in the SCW case. The receiver 900 may be a WTRU.

The precoder matrix codeword index is assumed to be fed back from the base station, (i.e., the eNodeB in LTE terminology), to the WTRU.

The receiver 900 includes a plurality of antennas $905_1$-$905_n$, a plurality of CP removal units $910_1$-$910_n$, a plurality of FFT units $915_1$-$915_n$, a channel estimator 920, a subcarrier demapping unit 925, a MIMO decoder 930, a plurality of IFFT units $935_1$-$935_n$, a plurality of data demodulators $940_1$-$940_n$, a plurality of deinterleavers $945_1$-$945_n$, a plurality of forward error correction (FEC) units $950_1$-$950_n$, a spatial deparser 955 and a feedback generator 960. The MIMO decoder 930 may be a minimum mean square error (MMSE) decoder, an MMSE-successive interference cancellation (SIC) decoder, a maximum likelyhood (ML) decoder, or a decoder using any other advanced techniques for MIMO.

Still referring to FIG. 9A, the CP removal units $910_1$-$910_n$ remove a CP from each of the data streams $908_1$-$908_n$ received by the antennas $905_1$-$905_n$. After CP removal, the processed data streams $912_1$-$912_n$ output by the CP removal units $910_1$-$910_n$ are converted to frequency domain data $918_1$-$918_n$ by the FFT units $915_1$-$915_n$. The channel estimator 920 generates a channel estimate 922 from the frequency domain data $918_1$-$918_n$ using conventional methods. The channel estimation is performed on a per subcarrier basis. The subcarrier demapping unit 925 performs the opposite operation which is performed at the transmitter 800 of FIG. 8A. The subcarrier demapped data $928_1$-$928_n$ is then processed by the MIMO decoder 930.

After MIMO decoding, the decoded data $932_1$-$932_n$ is processed by the IFFT units $935_1$-$935_n$ for conversion to time domain data $938_1$-$938_n$. The time domain data $938_1$-$938_n$ is processed by the data demodulators $940_1$-$940_n$ to generate bit streams $942_1$-$942_n$. The bit streams $942_1$-$942_n$ are processed by the deinterleavers $945_1$-$945_n$, which perform the opposite operation of the interleavers $825_1$-$825_n$ of the transmitter 800 of FIG. 8A. Each of the deinterleaved bit streams $948_1$-$948_n$ is then processed by each of FEC units $950_1$-$950_n$. The data bit streams $952_1$-$952_n$ output by the FEC units $950_1$-$950_n$ are merged by the spatial de-parser 955 to recover data 962. The feedback generator generates non-differential or differential feedback bits, which are fed back to the precoding matrix generator 875 of the transmitter 800.

Figure 9B:
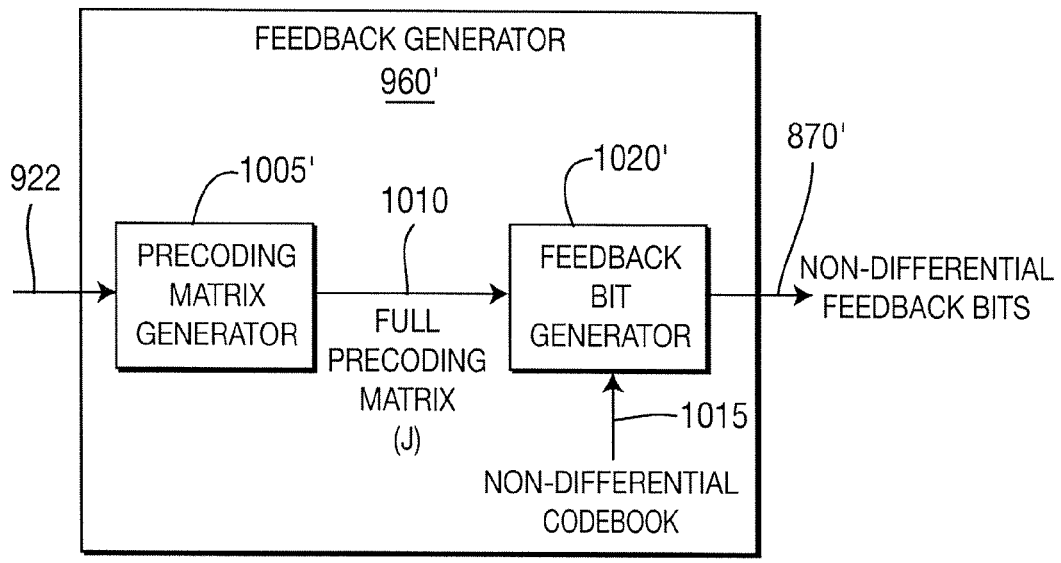
FIGS. 9B and 9C show details of the feedback generator of the receiver of FIG. 9A.
Figure 9C:
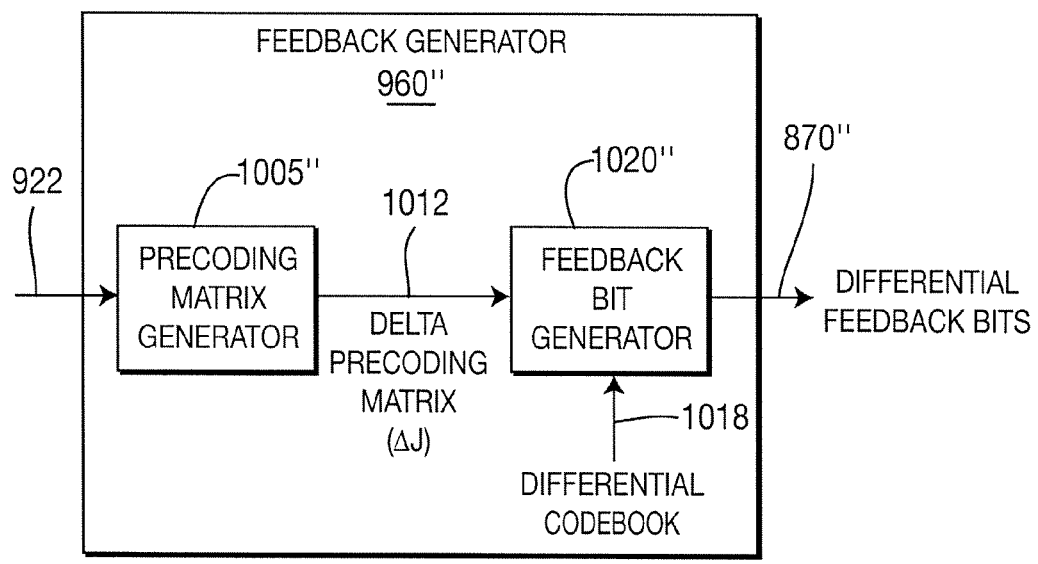

FIGS. 9B and 9C show details of the feedback generator 960 of the receiver 900 of FIG. 9A.

If the feedback bits 870 include non-differential feedback bits 870', the feedback generator 960 may be configured as the feedback generator 960' shown in FIG. 9B. The feedback generator 960' includes a precoding matrix generator 1005', which outputs a full precoding matrix 1010 (J) in the form of its parameters $\hat{\theta}$ and $\hat{\phi}$. The full precoding matrix 1010 is fed to a feedback bit generator 1020', which uses a non-differential codebook 1015 to generate non-differential feedback bits 870'.

If the feedback bits 870 include differential feedback bits 870", the feedback generator 960 may be configured as the feedback generator 960" shown in FIG. 9C. The feedback generator 960" includes a precoding matrix generator 1005", which outputs a delta precoding matrix 1012 (ΔJ) in the form of its parameters $\Delta\hat{\theta}$ and $\Delta\hat{\phi}$. The delta precoding matrix 1012 is fed to a feedback bit generator 1020", which uses a differential codebook 1018 to generate differential feedback bits 870".

Figure 10A:
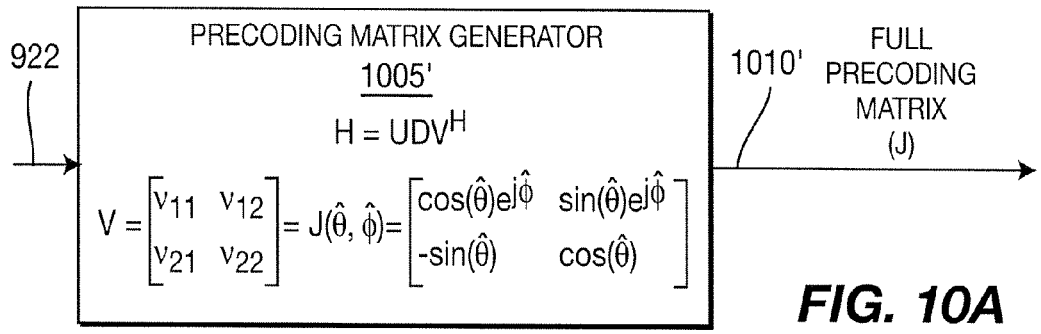
FIGS. 10A and 10B show different embodiments of the precoding matrix generator used in the feedback generator of FIG. 9B.
Figure 10B:
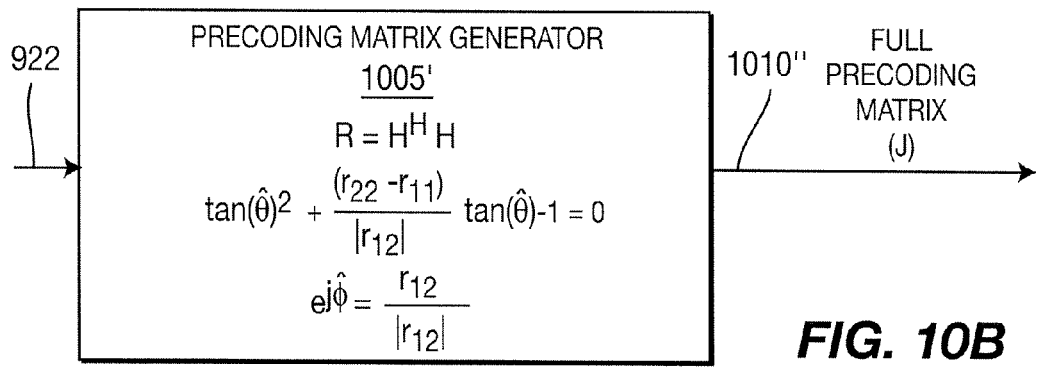

FIGS. 10A and 10B show different embodiments of the precoding matrix generator 1005' used in the feedback generator 960' of FIG. 9B. In one embodiment, the precoding matrix generator 1005' generates a full precoding matrix 1010' used to generate non-differential feedback bits based on Equations (1) and (6b). In another embodiment, the precoding matrix generator 1005' generates a full precoding matrix 1010" used to generate non-differential feedback bits based on Equations (2), (9) and (10).

Figure 10C:
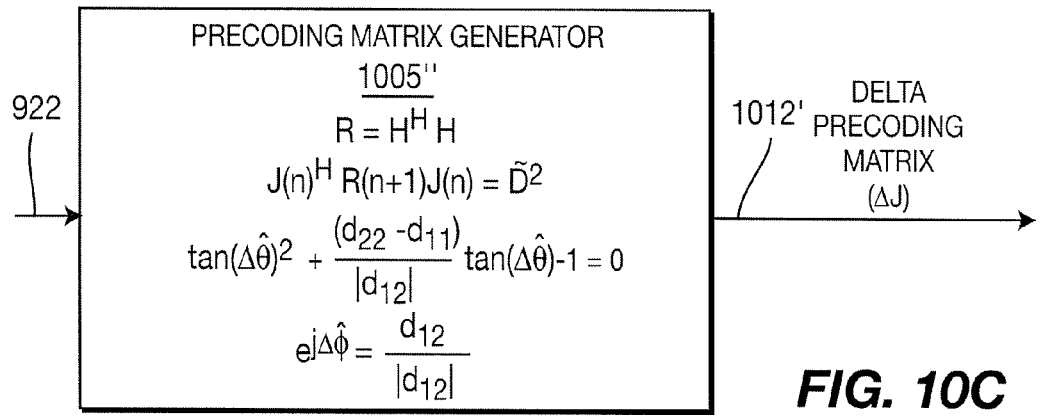
FIGS. 10C and 10D show different embodiments of the precoding matrix generator used in the feedback generator of FIG. 9C.
Figure 10D:
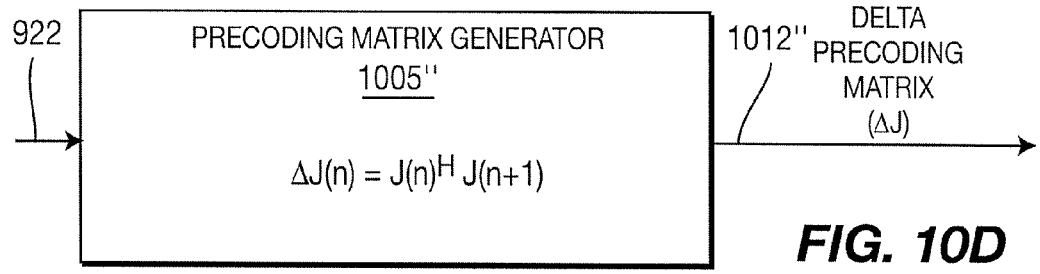

FIGS. 10C and 10D show different embodiments of the precoding matrix generator 1005" used in the feedback generator 960" of FIG. 9C. In one embodiment, the precoding matrix generator 1005" generates a delta precoding matrix 1012' used to generate differential feedback bits based on Equations (2), (12), (15) and (16). In another embodiment, the precoding matrix generator 1005" generates a delta precoding matrix 1012" used to generate differential feedback bits based on Equation (17).

Precoding

The precoding is based on transmit beamforming (TxBF) using, for example, eigen-beamforming based on SVD. While SVD is optimal, other algorithms may be used by the Node B.

As previously shown by Equation (1), for TxBF or eigen-beamforming the channel matrix is decomposed using a SVD or equivalent operation as:

$$H = UDV^H;$$

where H is the channel matrix. The precoding for spatial multiplexing, beamforming, and the like, can be expressed as:

$$x = Ts;$$ (Equation 20)

where s is the data vector and T is a generalized precoding matrix or transform matrix. In the case when transmit eigen-beamforming is used, the precoding or transform matrix T is chosen to be a beamforming matrix V which is obtained from the SVD operation above, i.e., T=V. Alternatively, the precoding or transform matrix T is chosen from a codebook or quantization. The selection of the codeword among codebook or quantization for precoding matrix T is based on some predetermined criterion, such as SINR, mean square error (MSE), channel capacity, and the like. Based on estimated channel matrix H, the precoding matrix among all candidate precoding matrices which has highest metrics, such as highest SNIR, largest channel capacity or smallest MSE is selected. Alternatively, based on SVD operation, the codeword or precoding matrix among all candidate precoding matrices in codebook that is the best quantization of the matrix V is selected. This is similar to eigen-beamforming for OFDMA, modified to apply to SC-FDMA.

Because the SVD operation results in orthogonal streams, the eNodeB can use a simple linear MMSE (LMMSE) receiver. It can be expressed as:

$$R = R_{ss}\tilde{H}^H(\tilde{H}R_{ss}\tilde{H}^H + R_{vv})^{-1};$$ (Equation 21)

where R is a receive processing matrix, $R_{ss}$ and $R_{vv}$ are correlation matrices and $\tilde{H}$ is an effective channel matrix which includes the effect of the V matrix on the estimated channel response. In FIG. 8A, the precoder 840 in the eNodeB (i.e., transmitter 800) produces the effective channel matrix at the WTRU using the last quantized precoder matrix sent from the eNodeB to the WTRU.

Feedback

An approach to feeding back the precoding matrix employs a codebook-based MIMO precoding scheme using combined differential and non-differential feedback as described previously in this specification.

This section presents selected simulation results for SU-MIMO. A comparison between SU-MIMO and SIMO is discussed first, followed by a comparison of the performance for single and double codeword SU-MIMO.

Simulation Parameters

The simulation parameters assumed are provided in Table 1. The achievable throughputs for various selections of the MCS for each spatial stream are provided in Table 2 below.

TABLE 2

| MCS | Achievable Data Rate (Mbps) | Spectral Efficiency (bps/Hz) |
|---|---|---|
| 16QAM r7/8-16QAM r3/4 | 19.9680 | 3.99 |
| 16QAM r7/8-16QAM r1/2 | 16.8960 | 3.38 |
| 16QAM r7/8-16QAM r1/3 | 14.8480 | 2.97 |
| 16QAM r5/6-QPSK r1/8 | 11.08 | 2.22 |
| 16QAM r5/6-QPSK r1/2 | 10.752 | 2.15 |
| 16QAM r3/4-QPSK r1/6 | 10.24 | 2.05 |
| 16QAM r1/2-QPSK r1/3 | 8.192 | 1.64 |
| 16QAM r1/2-QPSK r1/6 | 7.168 | 1.43 |
| 16QAM r1/3-QPSK r1/8 | 4.864 | 0.97 |
| 16QAM r1/4-QPSK r1/8 | 3.840 | 0.77 |

It is worth noting that the maximum achievable throughput using a double codeword and practical code rates in 5 MHz is 19.968 Mbps, which scales to 79.87 Mbps in a 20 MHz bandwidth, and has a spectral efficiency of 4 bps/Hz. SIMO, on the other hand, is limited to 10.75 Mbps in 5 MHz, a spectral efficiency of 2.15. Therefore, SU-MIMO can almost double the uplink data rate compared with SIMO.

Comparison of SU-MIMO to SIMO

Figure 11:
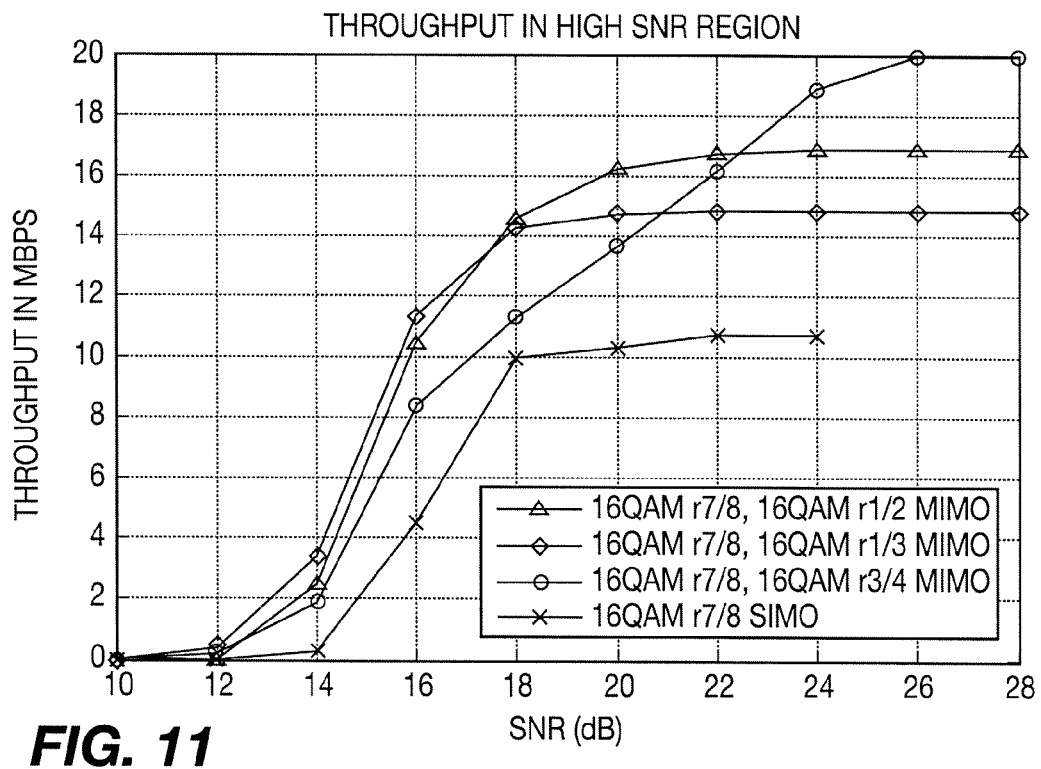
FIG. 11 shows a comparison of double codeword performance for single user MIMO (SU-MIMO) to single-input, multiple-output (SIMO) for the high data throughput SNR regions.

FIG. 11 shows a comparison of double codeword performance for SU-MIMO to SIMO for the high data throughput SNR regions. When the SNR is 24 dB, the maximum achievable throughput is approximately 19 Mbps, and when the SNR is greater than 26 dB the achievable throughput is approximately 19.97 Mbps. From this comparison it is worth noting that using SIMO the maximum achievable throughput is 10.5 Mbps at an SNR of 20 dB.

Comparison of SU-MIMO with Single and Double Codewords

This section presents a comparison of the performance for single and double codewords using uplink precoding MIMO for two antennas at the WTRU and eNodeB with the SCME-C channel. Because HARQ was not simulated, the same code rate was used for both SCW and DCW in order to compare them fairly. Also, it is impractical to use the same modulation for SCW for both streams when using precoding, so only combinations of QPSK and 16QAM are shown. Therefore, the higher throughput achievable with DCW is not shown.

Figure 12:
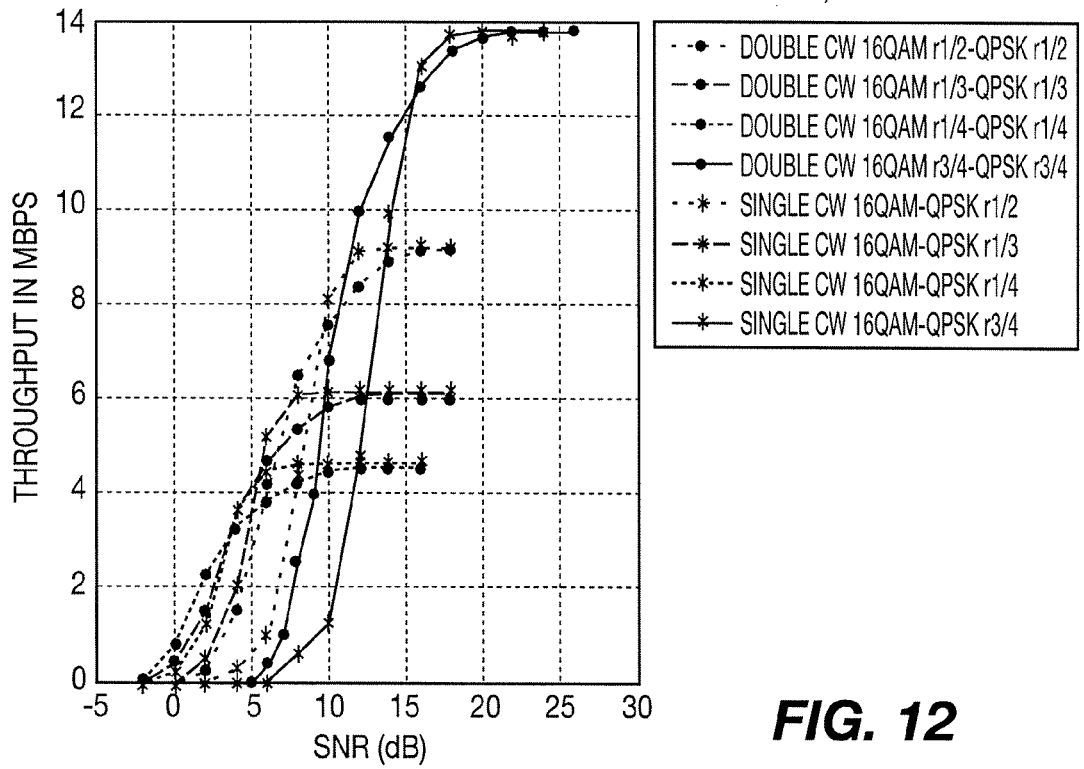
FIG. 12 shows a comparison of the performance for single and double codewords using uplink precoding MIMO for two or more antennas at the WTRU and an evolved Node-B (eNodeB) with an SCME-C channel.

FIG. 12 shows a comparison of the performance for single and double codewords using uplink precoding MIMO for two antennas at the WTRU and eNodeB with an SCME-C channel.

The DCW achieves a higher throughput at lower SNRs, while the opposite is true at higher SNRs. The SCW performs better than DCW. The difference is more pronounced at the highest data rates where a 3 dB difference can be seen. Eventually, since equal modulation and coding was used, both schemes reach the same maximum throughput, almost 14 Mbps in 5 MHz for the highest MCS simulated.

The reason that DCW performs better at lower SNR is because the upper eigen-mode has a higher SNR than the total system SNR. Therefore, at low SNR, that stream contributes some successful transmissions while the lower stream generally does not. However, at higher SNRs, the lower stream still has relatively high BLER which tends to reduce the total throughput for DCW. But, in the case of SCW, the upper stream protects the lower stream because the coding covers both streams. This results in an overall lower BLER for SCW at higher SNRs.

From these results it may be concluded that very high uplink spectral efficiency, about 2.8 bps/Hz, can be achieved using either method. However, DCW can achieve a higher spectral efficiency, about 4 bps/Hz, because it can use 16QAM with different code rates on each stream, whereas SCW must use a single code rate and different modulations.

In summary, uplink SU-MIMO for SC-FDMA according to the preferred embodiments disclosed herein achieve the following:

1) Precoding at the UE can be based on SVD or a comparable algorithm performed at the eNodeB. For an SCME-C channel, the codebook can be based on channel averages taken over several, (e.g., six adjacent RBs).

2) Feedback of the precoding matrix index can be performed efficiently using combined differential and non-differential feedback. Representative feedback parameters are 2 bits every 6 RBs sent every 6 TTIs, or a maximum of 1333 bps for 24 RBs in 5 MHz. Since the equivalent maximum data rate is 19.968 Mbps, the feedback efficiency is very high.

3) Simulations showed that SU-MIMO can almost double (186%) the uplink data rate compared with SIMO.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of providing precoding feedback comprising:
receiving a plurality of feedback bits;
updating a first precoding matrix based on the feedback bits, wherein the feedback bits are either non-differential feedback bits or differential feedback bits;
precoding a plurality of frequency domain data streams using the first precoding matrix;
receiving a plurality of time domain data streams, each time domain data stream including a cyclic prefix (CP);
removing the CPs from the time domain data streams to generate a plurality of processed data streams;
converting the processed data streams to frequency domain data;
performing channel estimation on the frequency domain data to generate a channel estimate;
generating a second precoding matrix based on the channel estimate; and
generating and transmitting feedback bits based on the second precoding matrix.

2. The method of claim 1 wherein the second precoding matrix is a delta precoding matrix and the feedback bits are differential feedback bits.

3. The method of claim 1 wherein the second precoding matrix is a full precoding matrix and the feedback bits are non-differential feedback bits.

4. The method of claim 3 wherein non-differential feedback bits are generated by using a Jacobi rotation to perform matrix diagonalization on at least one of a channel response matrix and a channel correlation matrix associated with the channel estimate.

5. The method of claim 1 wherein the feedback bits are non-differential feedback bits, the method further comprising:
mapping the non-differential feedback bits to a full precoding matrix by using a non-differential codebook.

6. The method of claim 1 wherein the method is implemented in a wireless communication system including a transmitter and a receiver.

7. The method of claim 6 wherein the receiver is incorporated in a wireless transmit/receive unit (WTRU).

8. The method of claim 6 wherein the transmitter is an evolved Node-B (eNodeB).

9. The method of claim 6 wherein the transmitter is a base station.

10. A method of providing precoding feedback comprising:
  receiving a plurality of feedback bits;
  updating a first precoding matrix based on the feedback bits, wherein the feedback bits are differential feedback bits;
  precoding a plurality of frequency domain data streams using the first precoding matrix;
  mapping the differential feedback bits to a delta precoding matrix by using a differential codebook; and
  generating a full precoding matrix based on the delta precoding matrix.

11. A method of providing precoding feedback comprising:
  receiving a plurality of feedback bits, the feedback bits representing changes or differences of parameters of a matrix transform;
  updating a first precoding matrix based on the feedback bits; and
  precoding a plurality of frequency domain data streams using the first precoding matrix.

12. The method of claim 11 wherein feedback is reset every N transmission timing intervals (TTIs), where N is a predetermined integer.

13. The method of claim 11 wherein feedback is reset every N feedback intervals, where N is a predetermined integer.

14. The method of claim 11 wherein feedback is reset aperiodically for avoiding error accumulation or propagation due to differential processing.

15. The method of claim 11 wherein the method is implemented in a wireless communication system including a transmitter and a receiver.

16. The method of claim 15 wherein the receiver is incorporated in a wireless transmit/receive unit (WTRU).

17. The method of claim 15 wherein the transmitter is an evolved Node-B (eNodeB).

18. The method of claim 15 wherein the transmitter is a base station.

19. A method of providing precoding feedback comprising:
  receiving a plurality of feedback bits;
  updating a first precoding matrix based on the feedback bits, wherein the feedback bits include differential feedback bits and non-differential bits; and
  precoding a plurality of frequency domain data streams using the first precoding matrix, wherein non-differential feedback occurs every N transmission timing intervals (TTIs) or every N feedback intervals, and differential feedback is used for the remaining TTIs or feedback intervals, where N is a predetermined integer.

20. The method of claim 19 wherein two (2) bits are used for differential feedback and three (3) bits are used for non-differential feedback.

21. The method of claim 20 wherein a codebook consisting of eight codewords that require three (3) feedback bits for quantization is used for non-differential feedback.

22. The method of claim 20 wherein a codebook consisting of four codewords that require two (2) feedback bits for quantization is used for differential feedback.

23. A receiver for providing feedback to a transmitter for updating a first precoding matrix used by the transmitter to precode a plurality of frequency domain data streams, the receiver comprising:
  a channel estimator configured to generate a channel estimate by performing a channel estimation on frequency domain data associated with a plurality of time domain data streams transmitted by the transmitter;
  a feedback generator electrically coupled to the channel estimator, the feedback generator configured to generate feedback bits for transmission to the transmitter based on the channel estimate, wherein the feedback bits are either non-differential feedback bits or differential feedback bits;
  a plurality of antennas configured to receive the time domain data streams;
  a plurality of cyclic prefix (CP) removal units electrically coupled to respective ones of the antennas, each CP removal unit being configured to remove a CP from each of a plurality of time domain data streams received by the antennas to generate processed data streams; and
  a plurality of fast Fourier transform (FFT) units electrically coupled to respective ones of the CP removal units and the channel estimator, each FFT unit being configured to convert the processed data streams to frequency domain data.

24. The receiver of claim 23 wherein the feedback generator comprises:
  a precoding matrix generator configured to generate a second precoding matrix based on the channel estimate; and
  a feedback bit generator electrically coupled to the precoding matrix generator, the feedback bit generator being configured to generate and transmit feedback bits based on the second precoding matrix.

25. The receiver of claim 24 wherein the second precoding matrix is a full precoding matrix and the feedback bits are non-differential feedback bits.

26. The receiver of claim 23 wherein the receiver is a wireless transmit/receive unit (WTRU).

27. The receiver of claim 23 wherein the transmitter is an evolved Node-B (eNodeB).

28. The receiver of claim 23 wherein the transmitter is a base station.

29. A receiver for providing feedback to a transmitter for updating a first precoding matrix used by the transmitter to precode a plurality of frequency domain data streams, the receiver comprising:
  a channel estimator configured to generate a channel estimate by performing a channel estimation on frequency domain data associated with a plurality of time domain data streams transmitted by the transmitter; and
  a feedback generator electrically coupled to the channel estimator, the feedback generator configured to generate feedback bits for transmission to the transmitter based on the channel estimate, wherein the feedback bits are differential feedback bits, the feedback generator including:
    a precoding matrix generator configured to generate a delta precoding matrix based on the channel estimate; and
    a feedback bit generator electrically coupled to the delta matrix generator, the feedback bit generator being configured to generate and transmit feedback bits based on the delta precoding matrix.

30. A receiver for providing feedback to a transmitter for updating a first precoding matrix used by the transmitter to precode a plurality of frequency domain data streams, the receiver comprising:
  a channel estimator configured to generate a channel estimate by performing a channel estimation on frequency domain data associated with a plurality of time domain data streams transmitted by the transmitter; and
  a feedback generator electrically coupled to the channel estimator, the feedback generator configured to generate feedback bits for transmission to the transmitter based on the channel estimate, the feedback bits representing changes or differences of parameters of a matrix transform.

31. The receiver of claim 30 wherein feedback is reset every N transmission timing intervals (TTIs), where N is a predetermined integer.

32. The receiver of claim 30 wherein feedback is reset every N feedback intervals, where N is a predetermined integer.

33. The receiver of claim 30 wherein feedback is reset aperiodically for avoiding error accumulation or propagation due to differential processing.

34. The receiver of claim 30 wherein the receiver is a wireless transmit/receive unit (WTRU).

35. The receiver of claim 30 wherein the transmitter is an evolved Node-B (eNodeB).

36. The receiver of claim 30 wherein the transmitter is a base station.

37. A receiver for providing feedback to a transmitter for updating a first precoding matrix used by the transmitter to precode a plurality of frequency domain data streams, the receiver comprising:
a channel estimator configured to generate a channel estimate by performing a channel estimation on frequency domain data associated with a plurality of time domain data streams transmitted by the transmitter; and
a feedback generator electrically coupled to the channel estimator, the feedback generator configured to generate feedback bits for transmission to the transmitter based on the channel estimate, wherein the feedback bits include differential feedback bits and non-differential bits, wherein non-differential feedback occurs every N transmission timing intervals (TTIs) or every N feedback intervals, and differential feedback is used for the remaining TTIs or feedback intervals, where N is a predetermined integer.

38. The receiver of claim 37 wherein two (2) bits are used for differential feedback and three (3) bits are used for non-differential feedback.

39. The receiver of claim 37 wherein a codebook consisting of eight codewords that require three (3) feedback bits for quantization is used for non-differential feedback.

40. The receiver of claim 37 wherein a codebook consisting of four codewords that require two (2) feedback bits for quantization is used for differential feedback.

41. A transmitter that performs precoding based on feedback provided by a receiver, the feedback being generated based on a plurality of time domain data streams that the receiver receives from the transmitter, the transmitter comprising:
a precoding matrix generator configured to receive feedback bits from the receiver and update a precoding matrix based on the feedback bits, wherein the feedback bits are either non-differential feedback bits or differential feedback bits; and
a precoder electrically coupled to the precoding matrix generator, the precoder being configured to precode a plurality of frequency domain data streams using the precoding matrix, the precoder including:
a feedback bits to delta precoding mapping unit for mapping differential feedback bits to a delta precoding matrix; and
a full precoding matrix generation and update unit for generating and updating a full precoding matrix based on the delta precoding matrix, wherein the precoder uses the full precoding matrix to precode the frequency domain data streams.

42. The transmitter of claim 41 wherein the precoder comprises:
a feedback bits to full precoding mapping unit for mapping non-differential feedback bits to a full precoding matrix, wherein the precoder uses the full precoding matrix to precode the frequency domain data streams.

43. The transmitter of claim 41 wherein the receiver is a wireless transmit/receive unit (WTRU).

44. The transmitter of claim 41 wherein the transmitter is an evolved Node-B (eNodeB).

45. The transmitter of claim 41 wherein the transmitter is a base station.

46. A transmitter that performs precoding based on feedback provided by a receiver, the feedback being generated based on signals that the receiver receives from the transmitter, the transmitter comprising:
a precoding matrix generator configured to receive feedback bits from the receiver and generate a precoding matrix based on the feedback bits, wherein the feedback bits represent changes or differences of parameters of a matrix transform; and
a precoder electrically coupled to the precoding matrix generator, the precoder being configured to precode a plurality of frequency domain data streams using the precoding matrix.

47. The transmitter of claim 46 wherein feedback is reset every N transmission timing intervals (TTIs), where N is a predetermined integer.

48. The transmitter of claim 46 wherein feedback is reset every N feedback intervals, where N is a predetermined integer.

49. The transmitter of claim 46 wherein feedback is reset aperiodically for avoiding error accumulation or propagation due to differential processing.

50. The transmitter of claim 46 wherein the receiver is a wireless transmit/receive unit (WTRU).

51. The transmitter of claim 46 wherein the transmitter is an evolved Node-B (eNodeB).

52. The transmitter of claim 46 wherein the transmitter is a base station.

53. A transmitter that performs precoding based on feedback provided by a receiver, the feedback being generated based on signals that the receiver receives from the transmitter, the transmitter comprising:
a precoding matrix generator configured to receive feedback bits from the receiver and generate a precoding matrix based on the feedback bits, wherein the feedback bits include differential feedback bits and non-differential bits; and
a precoder electrically coupled to the precoding matrix generator, the precoder being configured to precode a plurality of frequency domain data streams using the precoding matrix, wherein non-differential feedback occurs every N transmission timing intervals (TTIs) or every N feedback intervals, and differential feedback is used for the remaining TTIs or feedback intervals, where N is a predetermined integer.

54. The transmitter of claim 53 wherein two (2) bits are used for differential feedback and three (3) bits are used for non-differential feedback.

55. The transmitter of claim 53 wherein a codebook consisting of eight codewords that require three (3) feedback bits for quantization is used for non-differential feedback.

56. The transmitter of claim 53 wherein a codebook consisting of four codewords that require two (2) feedback bits for quantization is used for differential feedback.

57. The transmitter of claim 53 wherein the precoder comprises:

a feedback bits to full precoding mapping unit for mapping non-differential feedback bits to a full precoding matrix, wherein the precoder uses the full precoding matrix to precode the frequency domain data streams.

58. A transmitter that performs precoding based on feedback provided by a receiver, the feedback being generated based on signals that the receiver receives from the transmitter, the transmitter comprising:

a precoding matrix generator configured to receive feedback bits from the receiver and generate a precoding matrix based on the feedback bits, wherein the feedback bits represent changes or differences of parameters of a matrix transform; and a precoder electrically coupled to the precoding matrix generator, the precoder being configured to precode a plurality of frequency domain data streams using the precoding matrix, the precoder including:

a feedback bits to delta precoding mapping unit for mapping the feedback bits to a delta precoding matrix; and a full precoding matrix generation and update unit for generating and updating a full precoding matrix based on the delta precoding matrix, wherein the precoder uses the full precoding matrix to precode the frequency domain data streams.

* * * * *